W. C. DOLCATER.
LOCK CLAMP FOR KNOCKDOWN FURNITURE STRUCTURES.
APPLICATION FILED SEPT. 15, 1908.

909,561. Patented Jan. 12, 1909.

Witnesses Inventor
William C. Dolcater.
By C. A. Snow & Co.
Attorneys

UNITED STATES PATENT OFFICE.

WILLIAM C. DOLCATER, OF COLUMBUS, GEORGIA, ASSIGNOR OF ONE-HALF TO ERNEST L. HILL, OF COLUMBUS, GEORGIA.

LOCK-CLAMP FOR KNOCKDOWN FURNITURE STRUCTURES.

No. 909,561.  Specification of Letters Patent.  Patented Jan. 12, 1909.

Application filed September 15, 1908. Serial No. 453,162.

*To all whom it may concern:*

Be it known that I, WILLIAM C. DOLCATER, a citizen of the United States, residing at Columbus, in the county of Muscogee and State of Georgia, have invented a new and useful Lock-Clamp for Knockdown Furniture Structures, of which the following is a specification.

This invention has relation to lock clamp for knock down furniture structures and the like, and it consists in the novel construction and arrangement of its parts, as hereinafter shown and described.

The object of the invention is to provide a lock clamp adapted to be used as indicated and which is of simple construction and arrangement, and which may be easily and readily applied to the sides or end portions of knock-down furniture, such, for instance, as show-cases and box-frames, and is especially adapted to be used upon those parts of furniture frames which are devoid of beadings or rabbets.

With the above objects in view, the lock clamp consists primarily of a member having side portions lying in planes at angles to each other, and each side portion being provided with an elongated slot, which slots are also pitched at an angle with relation to each other. The ends of the slots toward one end of the member are nearer each other than the opposite ends of the said slots. Each slot is provided with a drawing edge which is notched or serrated and the slots are provided at those ends which diverge from each other with enlarged openings through which screw-heads may be inserted so that the shanks of the screws referred to may pass along the said slots during the act in which the clamp is drawing the parts of the structure together. One end of the said member is provided with a flange which is located transversely with relation to the side portions of the member, and occupies a plane substantially at right angles to those occupied by the said side portions of the member.

Figure 1:
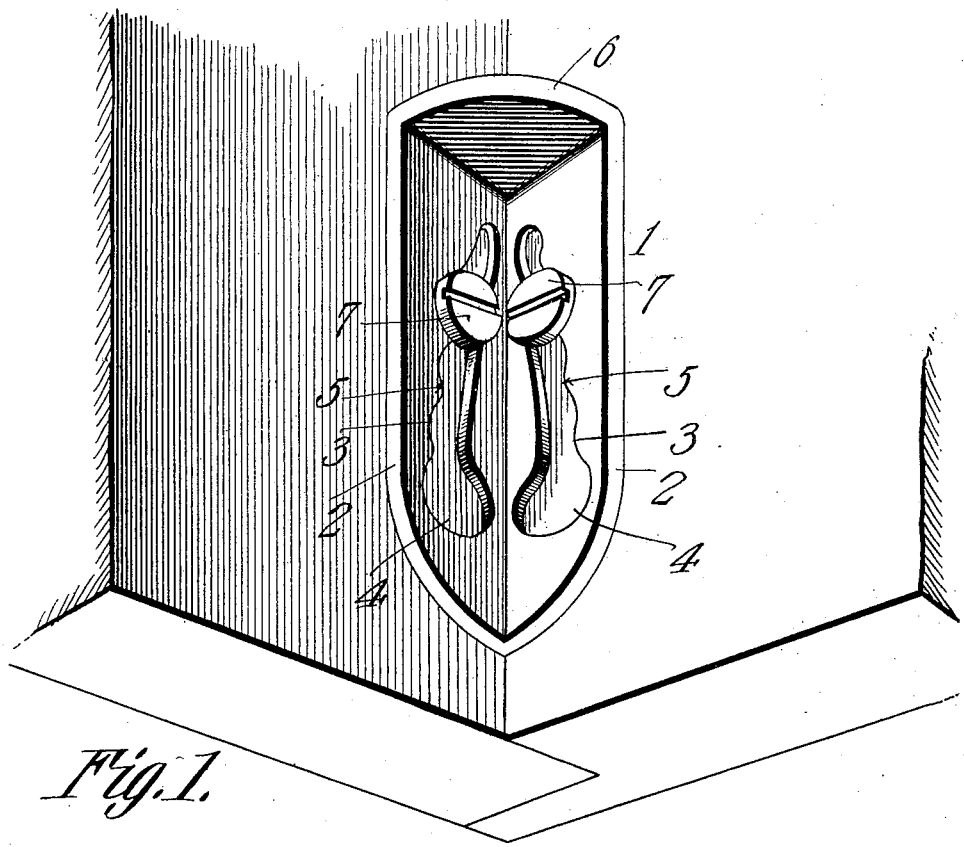
Figure 2:
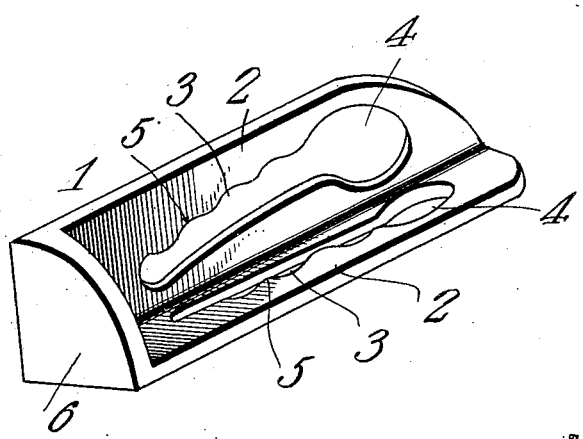

Figure 1 is a perspective view of the clamp applied. Fig. 2 is a perspective view of the clamp detached.

The lock clamp consists of the member 1 which, in part, is made up of side portions 2, which are disposed at an angle with relation to each other. Each side portion 2 is provided with an elongated slot 3. The said slots 3 converge towards each other at one end, and at their opposite ends are provided with the enlarged openings 4, through which screw-heads may be inserted, in order that the shanks of the said screws may pass along the said slots, as will hereinafter appear. The outer edges of the slots 3 are serrated as at 5, and the said serrated edges constitute the drawing edges of the slots. The flange 6 is located at one end of the member 1 and is transversely disposed with relation to the side portions 2 and occupies a plane substantially at right angles to those planes occupied by the said side portions.

In operation the clamp is applied as follows:—The parts of the frame of the furniture which are to be held together are provided with the screws 7 which are spaced at appropriate distances from the ends of the portions of the structure which are to be held together. The member 1 is then applied to the screws 7 by passing the heads of the said screws through the openings 4 at the ends of the slots 3, and then the member 1 is moved longitudinally by tapping upon the flange 6, and thus the said slots 3 will be moved along the shanks of the screws 7, and as the said screws approach those ends of the slots which are disposed toward each other the ends of the structure of which the article of furniture is composed will be drawn towards each other, and as the shanks of the screws 7 engage the serrations 5 provided at the drawing edges of the slots 3 the said serrations will hold the member 1 against a tendency to retraction. After the article of furniture is once set up and should the parts thereof shrink or warp, they can be retightened by merely forcing the member 1 still further along the shanks of the screws 7, when the parts will be drawn together as above indicated. When it is desired to separate the parts of the structure for shipment or other purposes, the operation above described is reversed, when the parts may be compactly assembled for storage, etc.

Having described my invention, what I claim as new, and desire to secure by Letters Patent, is:—

A fastener comprising a member having side portions occupying planes at an angle to each other and provided at one end with a flange which is transversely disposed with relation to the said side portions, the said side portions having elongated slots converging toward each other and which are provided at their diverging ends with openings of greater diameter than the width of the slots, said slots being provided with serrated drawing edges and being adapted to receive the shanks of securing devices.

In testimony that I claim the foregoing as my own, I have hereto affixed my signature in the presence of two witnesses.

WILLIAM C. DOLCATER.

Witnesses:
JNO. H. WALTON,
C. D. SMITH.